United States Patent
Tanabe

(10) Patent No.: US 7,911,331 B2
(45) Date of Patent: Mar. 22, 2011

(54) COLLISION DETECTOR

(75) Inventor: Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 331 days.

(21) Appl. No.: 12/218,337

(22) Filed: Jul. 14, 2008

(65) Prior Publication Data

US 2009/0021359 A1 Jan. 22, 2009

(30) Foreign Application Priority Data

Jul. 17, 2007 (JP) .................................. 2007-186192

(51) Int. Cl.
*B60Q 1/00* (2006.01)
(52) U.S. Cl. ...................... 340/436; 340/425.5; 180/274
(58) Field of Classification Search .................. 340/436, 340/425.5; 180/274
See application file for complete search history.

(56) References Cited

U.S. PATENT DOCUMENTS

| | | | |
|---|---|---|---|
| 7,148,792 B2 * | 12/2006 | Takafuji et al. ............... | 340/436 |
| 7,429,916 B2 * | 9/2008 | Kiribayashi ................... | 340/436 |
| 2005/0096815 A1 * | 5/2005 | Takafuji et al. ............... | 340/436 |
| 2005/0154530 A1 * | 7/2005 | Hosokawa et al. ........... | 340/436 |
| 2006/0087417 A1 | 4/2006 | Kiribayashi | |
| 2006/0237255 A1 * | 10/2006 | Wanami et al. ............... | 180/274 |
| 2007/0051599 A1 | 3/2007 | Takehara et al. | |
| 2007/0106474 A1 * | 5/2007 | Ide ................................ | 340/436 |
| 2007/0114803 A1 | 5/2007 | Takahashi et al. | |
| 2007/0132565 A1 | 6/2007 | Tanabe | |
| 2007/0227797 A1 | 10/2007 | Takahashi et al. | |
| 2008/0258887 A1 * | 10/2008 | Gelberi et al. ................ | 340/436 |

FOREIGN PATENT DOCUMENTS

| | | |
|---|---|---|
| JP | 2000-264142 | 9/2000 |
| JP | 2005-186677 | 7/2005 |
| JP | 2006-117157 | 5/2006 |
| JP | 2006-321442 | 11/2006 |
| JP | 2007-071596 | 3/2007 |
| JP | 2007-163322 | 6/2007 |
| JP | 2007-290682 | 11/2007 |
| JP | 2007-290689 | 11/2007 |
| JP | 2007-302060 | 11/2007 |
| WO | WO 2004/058545 | 7/2004 |
| WO | WO 2005/110819 | 11/2005 |
| WO | WO 2006/123236 | 11/2006 |

OTHER PUBLICATIONS

Office action dated Jun. 4, 2009 in corresponding Japanese application No. 2007-186192.

* cited by examiner

*Primary Examiner* — Eric M Blount
(74) *Attorney, Agent, or Firm* — Harness, Dickey & Pierce, PLC

(57) ABSTRACT

A walker collision detector includes a chamber member and a pressure sensor. The chamber member defines a chamber. On a back side of the chamber member, a concave portion for housing the pressure sensor is formed. The pressure sensor is connected to the chamber member for detecting the pressure in the chamber. The pressure sensor in a housed condition in the concave portion is connected to the chamber member, and is fixed on a front face of a bumper reinforcement. Therefore, a pressure sensor arrangement space conventionally required for installing the pressure sensor is not required, and cutting work or the like of the bumper reinforcement is not required. As a result, the walker collision detector has an improved installability on a vehicle.

6 Claims, 2 Drawing Sheets

FRONT ←→ REAR

FRONT ←→ REAR

FRONT ←→ REAR

COLLISION DETECTOR

CROSS REFERENCE TO RELATED APPLICATION

The present application is based on and claims the benefit of priority of Japanese Patent Application No. 2007-186192 filed on Jul. 17, 2007, the disclosure of which is incorporated herein by reference.

FIELD OF THE INVENTION

The present disclosure generally relates to a collision detector for detecting a collision of a walker or the like with a vehicle.

BACKGROUND INFORMATION

Conventionally, a collision of a walker, a pedestrian or the like with a vehicle is detected by a device that is disclosed, for example, in Japanese patent document JP-A-2006-117157 (Also published as US patent document 20060087417). This obstacle detection device for vehicular use in the above disclosure includes an absorber, a pressure sensor, a speed sensor, and an airbag ECU device. The absorber absorbs an impact of the collision that is caused by a collision of an object on the vehicle. The absorber includes a chamber member and a connection member. The chamber member is connected by using the connection member, and is fixed on a front face of a bumper reinforcement. The inside of the chamber member, that is, a chamber, is filled with air. The pressure sensor is a sensor for detecting a pressure in the chamber. The pressure sensor is connected to the connection member through a tube. The speed sensor is disposed in a vehicle. The pressure sensor and the speed sensor are connected to the airbag ECU. The airbag ECU determines whether the colliding object that collides with the bumper of the vehicle is a walker based on a detection result of the pressure sensor and the speed sensor. More practically, whether the pressure inside the chamber exceeds a threshold that is determined based on the vehicle speed is used as a criterion for determination that the colliding object is a walker.

The obstacle detection device for use in a vehicle described above has the pressure sensor connected to the chamber member through a tube. Therefore, the chamber member proximity of the bumper reinforcement where the chamber member is fixed must have a pressure sensor arrangement space for installing the pressure sensor. For avoiding a preparation of the pressure sensor arrangement space, the pressure sensor may be connected on a back side of the chamber member. However, in that case, the pressure sensor has to be buried in a cut or the like in the bumper reinforcement for avoiding the interference with the pressure sensor. In either case, the pressure sensor makes it difficult for the obstacle detection device to be installed on a vehicle.

SUMMARY OF THE INVENTION

In view of the above and other problems, the present disclosure provides a collision detector having a pressure sensor and a chamber member for defining a chamber with an improved installability on a vehicle.

The fact that the chamber member having a concave portion on a back side of the chamber member has an improved installability on a vehicle is found based on a continued effort, experiments and endeavor of the inventor.

That is, a collision detector includes: a chamber that defines a hollow space; and a pressure sensor that is connected to the chamber and is capable of detecting a pressure in the hollow space. The chamber has a concave portion that houses the pressure sensor on a rear side, and the pressure sensor is connected to the chamber in a housed condition in the concave portion.

The above configuration of the collision detector houses the pressure sensor in the concave portion of the chamber, thereby making it possible to arrange the pressure sensor without providing a dedicated space for installing the pressure sensor. Further, making a cut on the bumper reinforcement or the like is not required for installing the pressure sensor. Therefore, the installability of the collision detector on the vehicle is improved.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention is described in the following for providing what the idea of the present invention is. In the present embodiment, an example which is an application of a collision detection device of the present invention to a walker collision detection apparatus to detect a walker who collides with a bumper of a vehicle is shown.

First Embodiment

Figure 1:
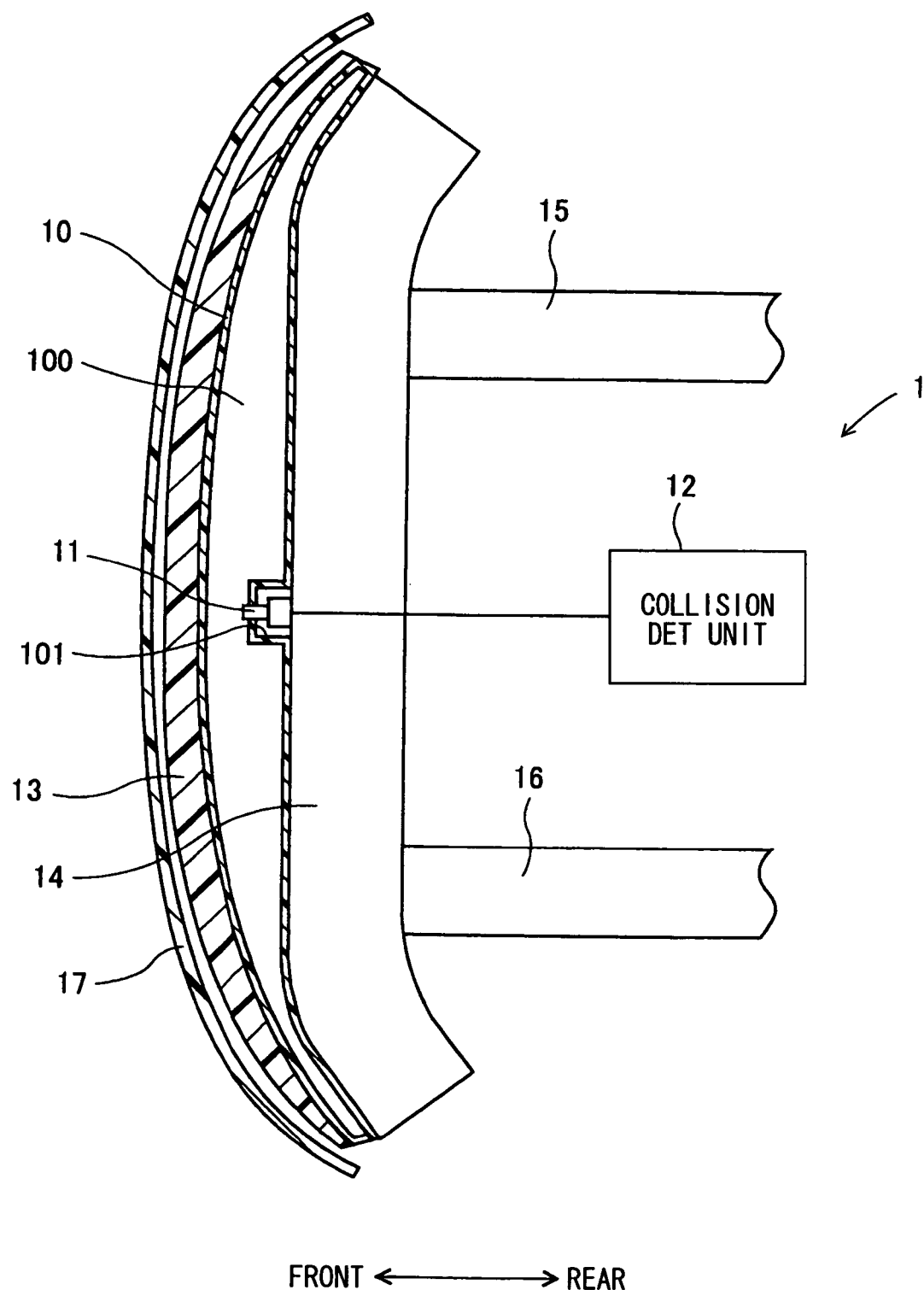
FIG. 1 is a configuration of a walker collision detection apparatus in a first embodiment of the present invention.
Figure 2:
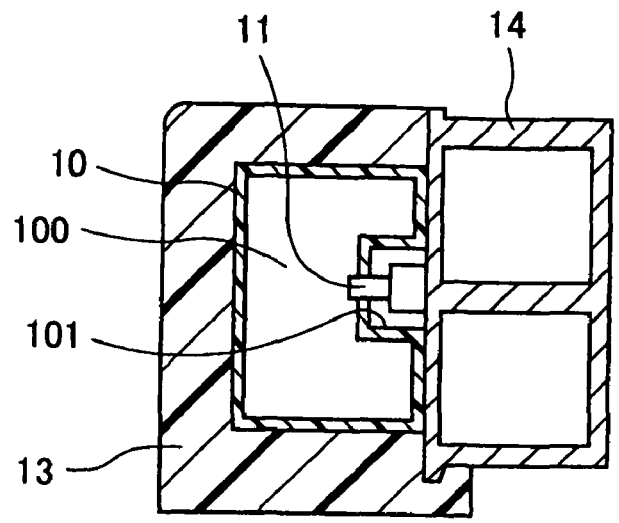
FIG. 2 is a cross-sectional view of a bumper reinforcement, a chamber member and a bumper absorber in the first embodiment.

At first the configuration of the walker collision detection apparatus is explained referring to FIG. 1 and FIG. 2. FIG. 1 is a configuration of the walker collision detection apparatus in the first embodiment of the invention. FIG. 2 is a cross-sectional view of a bumper reinforcement, a chamber member and a bumper absorber. In addition, the front and rear direction in the drawing shows the front and rear direction of the vehicle.

As shown in FIG. 1 and FIG. 2, a walker collision detection apparatus 1 (a collision detection device) consists of a chamber member 10, a pressure sensor 11, a walker collision determination unit 12, and a bumper absorber 13.

The chamber member 10 is a member to define a chamber 100 that is a substantially sealed space made of resin or the like. The chamber member 10 is in a long sack shape. In the chamber 100, air is sealed. The chamber member 10 is fixed on a front face of a bumper reinforcement 14 that extends in a vehicle width direction. In this case, the bumper reinforcement 14 is fixed on a front edge of a pair of side members 15, 16 that extend in a front and back direction of the vehicle to constitute a vehicle frame. A rear side of the chamber member 10 has a concave portion 101 in a rectangular solid shape for housing the pressure sensor 11. More practically, the concave portion 101 is formed at a center of the front face of the bumper reinforcement 14 in an area that is between the pair of the side members 15, 16.

The pressure sensor 11 is a sensor that is connected to the chamber member 10 for detecting pressure in the chamber 100. In a condition housed in the concave portion 101, the sensor 11 is connected to the chamber member 10, and the pressure sensor 11 is fixed on the front of the bumper reinforcement 14. Therefore, it is not necessary to secure a placement space of the pressure sensor 11 separately as the conventional structure. In addition, it is not necessary to form a cut or the like on the bumper reinforcement 14, which requires a separate and discrete processing.

The walker collision determination unit 12 determines, based on a detection result of the pressure sensor 11, whether a colliding object is a walker, and outputs a corresponding signal. That is, for example, the determination unit 12 is a device having a microcomputer or the like. The walker collision determination unit 12 is arranged in an inside of the vehicle, and it is connected to the pressure sensor 11.

The bumper absorber 13 is, for example, an elongated form member made of resin with a U shape cross section for absorbing an impact of collision of the vehicle. The absorber 13 is disposed to cover the circumference of the chamber member 10, and the absorber 13 is fixed to the bumper reinforcement 14. Further, in front of the bumper absorber 13, a bumper cover 17 made of, for example, resin is disposed. The bumper cover 17 has an elongated board form.

An operation of the walker collision detection apparatus is explained referring to FIG. 1 and FIG. 2 in the following. When an electric power is supplied for the walker collision detection apparatus 1 in FIG. 1 and FIG. 2, the pressure sensor 11 and the walker collision determination unit 12 starts the operation. When a walker collides with the bumper cover 17, the bumper cover 17 is deformed backward. The deformation of the cover 17 leads to the deformation of the bumper absorber 13 and the chamber member 10. The bumper absorber 13 absorbs the shock and the impact that is caused by a collision while being deformed. The pressure in the chamber 100 rises as the chamber 100 deforms. The pressure sensor 11 detects pressure in the chamber 100. The walker collision determination unit 12 determines, based on a detection result of the pressure sensor 11, whether the colliding object is a walker, and outputs a corresponding signal.

The advantageous effects of the present embodiment are explained in the following. That is, a separately provided pressure sensor space in the conventional art is not required because of the concave portion 101 formed in the rear of the chamber member 10. Further, the cut forming process or the like is not required for forming the cut on the reinforcement 14. Therefore, the installability of the walker collision detection apparatus 1 on the vehicle is improved.

The arrangement of the concave portion 101 at the center of the pair of the side members 15, 16 and on the front side of the reinforcement 14 makes it easier to install the sensor 11, because there is plenty of space between the bumper cover 17 and the reinforcement 14 at the center of the pair of the side members 15, 16 in comparison to the both side ends of the reinforcement 14 as shown in FIG. 1.

In addition, in the first embodiment, the example which installed the walker collision detection apparatus 1 in the bumper of the vehicle front is provided. However, the walker collision detection apparatus 1 may also be used on the rear side of the vehicle. Even in that case, the same effect is achieved.

Further, in the first embodiment, the collision may be detected by the walker collision detection unit 12 based on the combination of detection results from the pressure sensor 11 and other detectors, such as an acceleration sensor or the like. The other sensor may be integrally formed with the pressure sensor 11. The position of the pressure sensor 11 at the center of the side members 15, 16 is effective in terms of collision detection, thereby leading to a collision detection in a secure manner. This is because the portion between the side members 15, 16 receives a greater impact from the collision relative to other portions of the vehicle.

Furthermore, in the first embodiment, the bumper absorber 13 is made of resin. However, the absorber 13 may also be made of metal such as a metal plate or the like.

Furthermore, the combination of the detection result from the pressure sensor 11 and other sensors such as a speed sensor may also be used for detecting the collision by the walker collision determination unit 12.

Second Embodiment

The walker collision detection apparatus of the second embodiment is explained in the following. The walker collision detection apparatus of the second embodiment has changed relations between the chamber member and the bumper absorber relative to the walker collision detection apparatus of the first embodiment.

Figure 3:
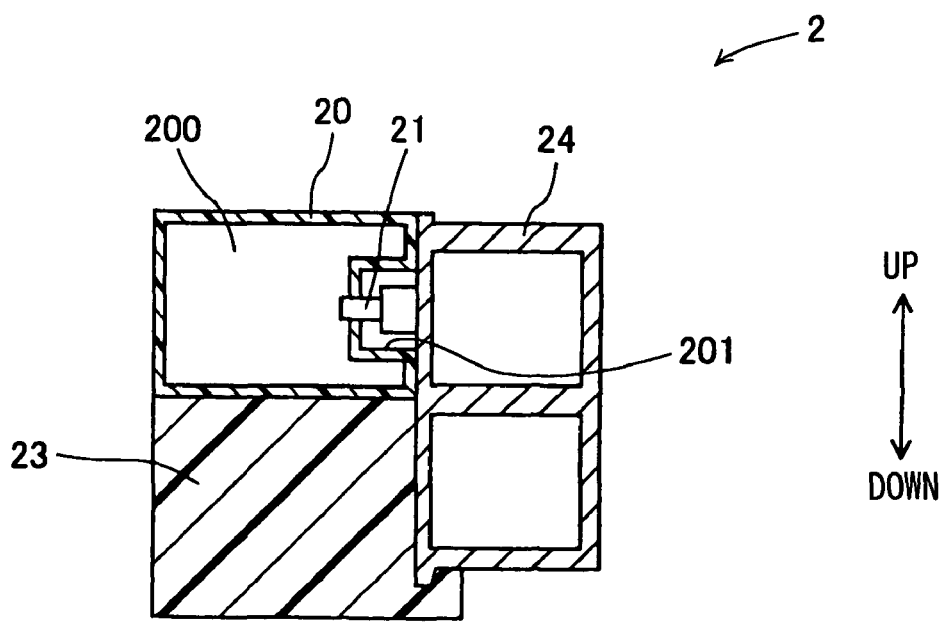
FIG. 3 is a cross-sectional view of a bumper reinforcement, a chamber member and a bumper absorber in a second embodiment of the present invention.

FIG. 3 is used to describe the configuration of the walker collision detection apparatus. FIG. 3 is a cross-sectional view of the bumper reinforcement, the chamber member and the bumper absorber of the walker collision detection apparatus in the second embodiment. In addition, a front and rear direction and an up and down direction in the drawing indicates a front and rear direction of the vehicle and an up and down direction of the vehicle. The following description only deals with the difference of the relations between the chamber member and the bumper absorber, and the description is omitted for the common part except for the required portion.

A walker collision detection apparatus 2 (a collision detection device) has a chamber member 20, a pressure sensor 21, and a bumper absorber 23 as shown in FIG. 3. For example, the chamber member 20 is a member in a long sack shape made of resin with its cross-section being formed substantially as a square. The chamber member 20 is fixed at an upper front side of a bumper reinforcement 24 that extends in a vehicle width direction. Further, for example, the bumper absorber 23 is a member in a long rod shape made of resin with its cross-section being formed substantially as a rectangle. The bumper absorber 23 is disposed with its top face abutted to the lower face of the chamber member 20, and is fixed on a lower front side of the bumper reinforcement 24. Dimensions of the parts in the front and rear direction are arranged so that the front side face of the chamber member 20 and the front side face of the bumper absorber 23 are aligned to be on the same plane. The pressure sensor 21 and a concave portion 201 for accommodating the pressure sensor 21 are identically configured as the first embodiment.

The advantageous effects of the walker collision detection apparatus 2 in the second embodiment is same as the apparatus 1 in the first embodiment, because only the relations of the chamber member 20 and the bumper absorber 23 are different from the walker collision detection apparatus 1 in the first embodiment.

What is claimed is:

1. A collision detector for detecting a collision of a vehicle with an object comprising:
   a chamber that defines a hollow space; and a pressure sensor that is connected to the chamber and is capable of detecting a pressure in the hollow space, wherein the chamber has a concave portion that houses the pressure sensor on a rear side thereof, and the pressure sensor is connected to the chamber in a housed condition in the concave portion.

2. The collision detector of claim 1, wherein the pressure sensor is fixed on a front face of a bumper reinforcement.

3. The collision detector of claim 1, wherein the pressure sensor is fixed on a front face of a bumper reinforcement, the bumper reinforcement extends in a vehicle-width direction and is fixed on front ends of a pair of side members that extend in a front-rear direction of a vehicle, and the chamber is on a front side of the bumper reinforcement with the concave portion formed at a position between the pair of the side members.

4. The collision detector of claim 3 further comprising:

a determination unit capable of determining a collision, wherein the pressure sensor includes an acceleration sensor that detects acceleration of the vehicle, and the determination unit determines the collision of the vehicle with the object based on a detection result of the pressure sensor and the acceleration sensor.

5. The collision detector of claim 1 further comprising a pedestrian determination unit that uses the detection result of the pressure sensor to determine whether a colliding object is a pedestrian.

6. The collision detector of claim 1, wherein the pressure sensor is disposed on an outside of the hollow space.

* * * * *